Patented Jan. 2, 1934

1,941,702

UNITED STATES PATENT OFFICE 1,941,702

METHOD OF REDUCING SULPHUR COMPOUNDS TO ELEMENTARY SULPHUR OR HYDROGEN SULPHIDE

Charles G. Maier, Berkeley, Calif., assignor of one-fourth to Reginald S. Dean, Washington, D. C., and one-fourth to Henry A. Doerner, Reno, Nev.

No Drawing. Application February 7, 1931
Serial No. 514,319

4 Claims. (Cl. 23—226)

This invention relates to methods of obtaining elementary sulphur or hydrogen sulphide from sulphur compounds such as sulphur oxides, sulphates etc. by reduction with suitable gaseous reducing agents.

I am aware that processes for reducing sulphur dioxide to elementary sulphur or hydrogen sulphide by various reducing agents are old in the art. I have found however that a mixture of hydrogen and carbon monoxide in substantially the proportions of two parts of hydrogen to one of carbon monoxide is more efficacious than any reducing agent heretofore known when used in connection with any of several well known catalysts such as calcium sulphide or bauxite. Furthermore this mixture has the advantage of being produced from cheap hydrocarbons and metallic oxides as disclosed and claimed in my copending applications, Process of extracting zinc from its ores, (application Serial No. 513,458, filed February 4, 1931) and Process of producing active reducing gas mixtures (application Serial No. 514,320, filed February 7, 1931).

In one form of my invention gases containing 14–17 percent of sulphur dioxide and very little oxygen are subjected to reaction with carbon monoxide and hydrogen in the ratio of 1:2 at 850 degrees centigrade whereby the sulphur dioxide is reduced to elementary sulphur.

In another form of my invention roasted zinc sulphide which contains some residual zinc sulphate is treated with a mixture of carbon dioxide and hydrogen in the ratio of 1:2 at 450–800 degrees centigrade whereby the sulphur is reduced to elementary sulphur and hydrogen sulphide which are vaporized.

In the process of extracting zinc from its ores hereinabove referred to, I react natural gas consisting for the most part of methane with zinc oxide at an elevated temperature. The products of the reaction consist substantially entirely of zinc vapor, carbon monoxide and hydrogen, with traces of other gases, including some small amounts of uncombined methane. The zinc vapor is condensed out and the resulting outlet gases are almost entirely carbon monoxide and hydrogen. Theoretically and under the most perfect operating conditions, the volume of hydrogen is twice the volume of carbon monoxide, or approximately 66⅔%. Due to the traces of other gases and the loss of some portions of the hydrogen, the hydrogen may be reduced to as low as 55% of the whole. These outlet gases consisting substantially entirely of carbon monoxide and hydrogen, with the hydrogen comprising not less than 55% of the whole, are very suitable for my purpose.

Other uses of my invention will be apparent and the scope of my invention is only limited by the appended claims.

I claim:

1. In a process of reducing sulphur-oxygen compounds wherein the compound to be reduced is heated at an elevated temperature in the presence of a reducing agent, the improvement which comprises treating the compound to be reduced with a hydrogen-carbon monoxide mixture, the hydrogen constituting in an excess of 55 per cent. of the mixture.

2. In a process of reducing sulphur-oxygen compounds wherein the compound to be reduced is heated at an elevated temperature in the presence of a reducing agent, the improvement which comprises treating the compound to be reduced with a gaseous reducing agent comprising a mixture of hydrogen and carbon monoxide, the gases being present in the approximate proportion of 2 parts of hydrogen to each part of carbon monoxide.

3. The method of reducing sulphur dioxide which comprises treating the same with a mixture of approximately two-thirds hydrogen and one-third carbon monoxide at about 700–900° C. in the presence of a catalyst.

4. The method of reducing sulphur-oxygen compounds in zinc calcine which comprises treating said calcine at a temperature of approximately 450–800° C. with a hydrogen-carbon monoxide mixture, the hydrogen constituting in excess of 55 per cent. of the mixture.

CHAS. G. MAIER.